United States Patent [19]

Bharteey et al.

[11] 4,025,747
[45] May 24, 1977

[54] CIRCUIT INTERRUPTER STAB ASSEMBLY WITH SELF-ALIGNING CLIP TYPE CONTACT

[75] Inventors: Brij M. Bharteey, Bolingbrook; Neal E. Rowe, Oak Forest, both of Ill.

[73] Assignee: Westinghouse Electric Corporation, Pittsburgh, Pa.

[22] Filed: Sept. 11, 1975

[21] Appl. No.: 612,604

[52] U.S. Cl. .............................. 200/254; 200/258; 200/286
[51] Int. Cl.² ......................................... H01H 1/42
[58] Field of Search .................... 200/252–261, 200/282, 248, 286, 287; 339/64 R, 64 M, 192 R, 192 RL, 207 R, 207 S, 126 R

[56] References Cited

UNITED STATES PATENTS

2,172,181  9/1939  Sutton ........................... 200/254 X

*Primary Examiner*—James R. Scott
*Attorney, Agent, or Firm*—L. P. Johns

[57] ABSTRACT

A stab assembly for a circuit interrupter for use in drawout switchgear characterized by a circuit breaker movable into and out of contact with bus bars and having spaced terminals in substantial alignment with the bus bars, each terminal comprising a base and a pair of flexible contacts disposed on opposite sides of an axis and engageable with opposite sides of a bus bar, the base comprising lateral portions extending from the sides of the axis corresponding to the flexible contacts, a dielectric housing in which the base is pivotally mounted to affect rotation laterally of said axis, and the housing having a projection spaced from each lateral portion for limiting rotation therein.

5 Claims, 12 Drawing Figures

CIRCUIT INTERRUPTER STAB ASSEMBLY WITH SELF-ALIGNING CLIP TYPE CONTACT

CROSS-REFERENCE TO RELATED APPLICATIONS

This invention is related to the copending applications of John R. Wilson and Jerome C. Wolski, Ser. No. 612,526, filed Sept. 11, 1975; Forrest E. Coyle, John R. Wilson, and Brij M. Bharteey, Ser. No. 612,607, filed Sept. 11, 1975; John R. Wilson, Sadiq A. Shariff, and Brij Bharteey, Ser. No. 612,605, filed Sept. 11, 1975; John R. Wilson, Neal E. Rowe, and Brij M. Bharteey, Ser. No. 612,606, filed Sept. 11, 1975; Jerome C. Wolski and Neal E. Rowe, Ser. No. 612,524, filed Sept. 11, 1975; and Donald D. Armstrong and John R. Wilson, Ser. No. 612,525, filed Sept. 11, 1975.

BACKGROUND OF THE INVENTION

1. Field of the Invention

This invention relates to a circuit interrupter and more particularly to stab terminals for drawout switchgear.

2. Description of the Prior Art

In a motor control center a plurality of vertical bus bars distribute power to the motor controller units arranged in a vertical stack, one above the other. The electrical connection between the individual motor controller unit in a stack and the vertical bus bar is usually accomplished by a sliding plug-in-type of stab held in a stab block in the back of the unit. The absence of float in the stab for contact alignment and a loose guiding method sometimes results in the stab missing the bus bar. This causes a loose and hot contact and consequent failure.

It is important therefore that the stabs are held in a stab block with a cover. The connecting leads from the stabs to the unit devices are not exposed at the back of the unit. In that manner, a hazardous condition resulting from flash-over near the bus bars is avoided.

SUMMARY OF THE INVENTION

It has been found in accordance with this invention that the foregoing problem may be overcome by providing a circuit interrupter for use in drawout switchgear and comprising a stationary housing having stationary bus bars, a circuit breaker in the housing and comprising spaced terminals, the terminal being movable into and out of contact with the bus bars when the circuit breaker is moved into and out of the housing, each terminal comprising a base and a pair of flexible contacts disposed on opposite sides of an axis and engageable with opposite sides of a bus bar, the base comprising lateral portions extending from the sides of the axis corresponding to the flexible contacts, a dielectric enclosure for the terminal in which the base is pivotally mounted to effect rotation laterally of said enclosure having protuberances therein closely spaced to the lateral portions to limit said lateral rotation of the flexible contacts, whereby the terminal is free to move limitedly to align with a bus bar.

The advantage of the device of this invention is that the plug-in-type of stab terminal is movable within a constricted area and is thereby maintained in alignment with a corresponding bus bar.

DESCRIPTION OF THE PREFERRED EMBODIMENT

Figure 1:
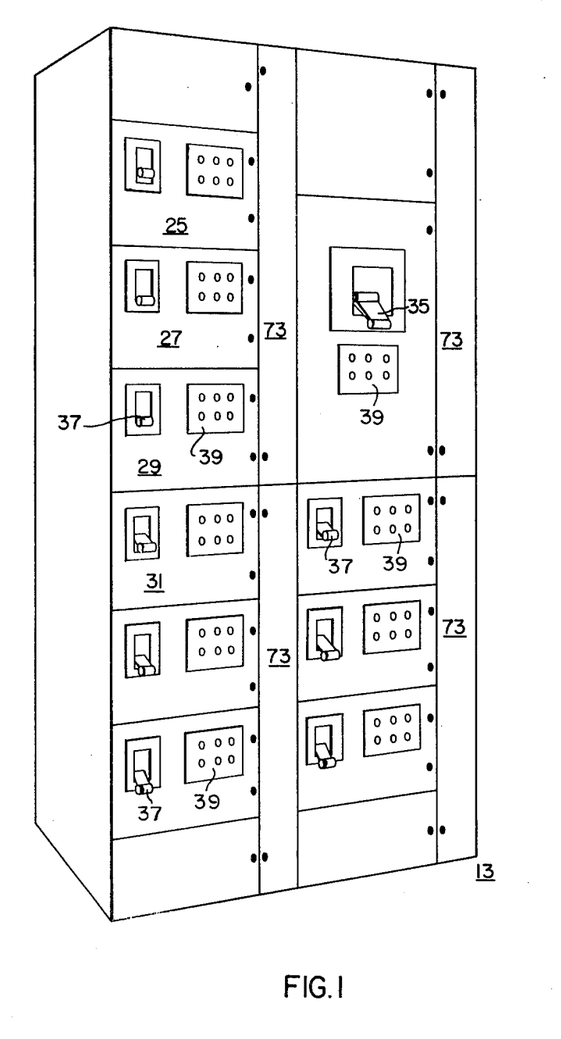
FIG. 1 is a perspective view of an electrical control center in accordance with this invention.

The electric control center of this invention is generally indicated at 13 in FIG. 1 and comprises a metal cabinet having a plurality of vertically disposed compartments such as compartments 15, 17, 19, and 21 which are separated by similar horizontal shelves 23, as shown in FIG. 2. Each compartment 15, 17, 19, 21 includes an access door 25, 27, 29, 31, respectively, which doors are provided with or without appropriate openings 33 to accommodate portions of circuit breakers, such as handles 35, 37 or indicator light panel 39 as required.

Figure 4:
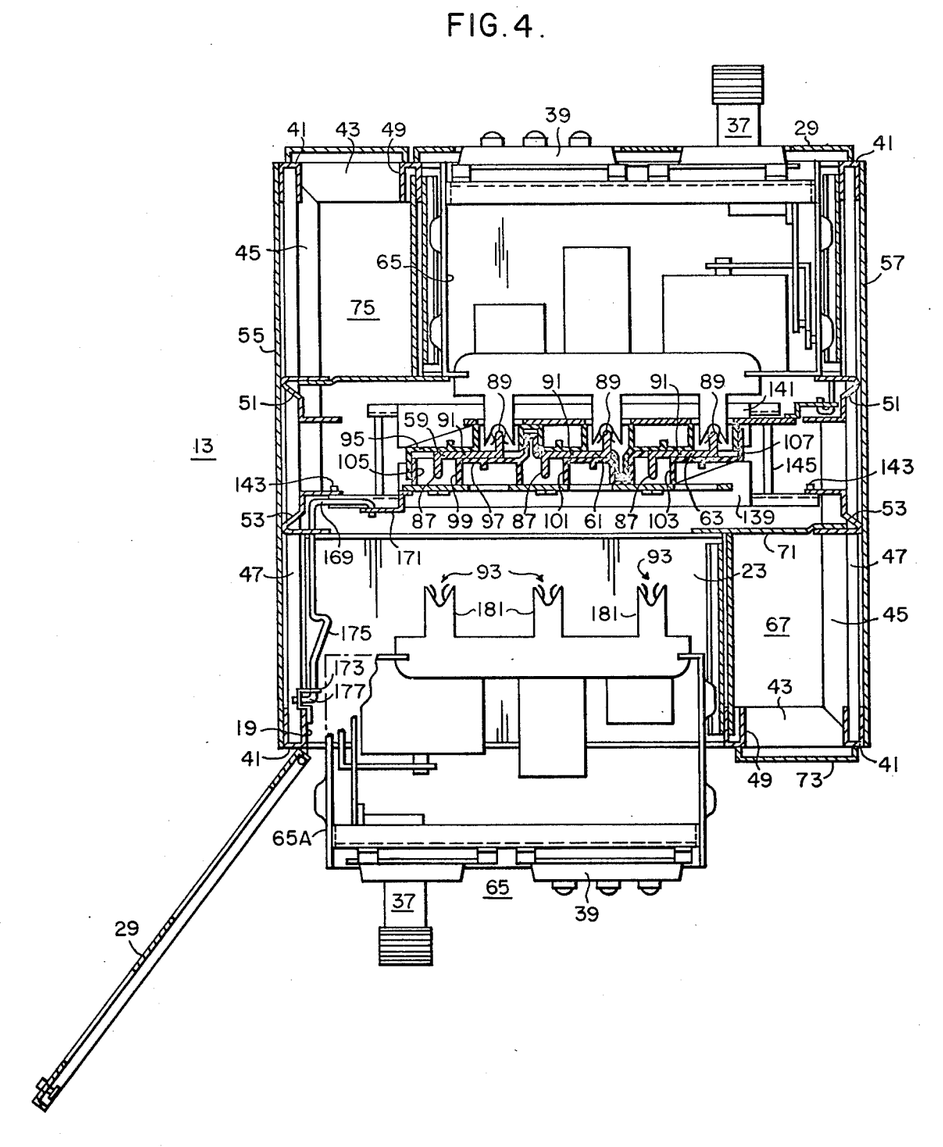
FIG. 4 is a horizontal sectional view taken on the line IV—IV of FIG. 2B and showing a circuit breaker being inserted in place.

The cabinet 13 includes a rectangular steel framework consisting of U-shaped corner posts 41 (FIG. 4), horizontal interconnectors 43, 45 at upper and lower ends and vertically spaced horizontal braces 47. In addition, the steel framework consists of upright posts 49, one at the front and rear sides of the cabinet 13. A pair of support posts 51 and 53 are also disposed at opposite sides of the cabinet 13 adjacent to opposite wall panels 55 and 57 as shown in FIG. 4.

In the embodiment of the invention disclosed herein, the front and rear sides of the cabinet 13 are provided with compartments similar to 15–21 on the front side in which circuit interrupters 65 may be inserted from opposite sides of vertical bus bars 59, 61, 63 which are centrally disposed between the front and rear sides of the cabinet 13. It is understood, however, that the cabinet 13 is operataive similarly where the rear side of the cabinet is not adapted for mounting of circuit interrupter 65. Suffice it to say, as shown in FIG. 4, the front side of the cabinet 13 comprises the stacked compartments 15, 17, 19, 21 on the left side of the upright post 49 and a vertically extending compartment 67 between the posts 49, 41. The compartment 67 is separated from the compartments 15-21 by a partition 69 and from the central area of the bus bars by a partition 71. Access to the compartment 67 is provided by a vertical door 73. The compartment 67 extends vertically between the upper and lower ends of the cabinet 13 and is provided for electric wires leading from the several circuit interrupters 65 disposed in the compartments 17, 19, 21. In embodiments of the invention having circuit interrupters 65 disposed at the rear wall, a vertical compartment 75 is likewise disposed for the same purpose as the compartment 67.

Figure 2A:
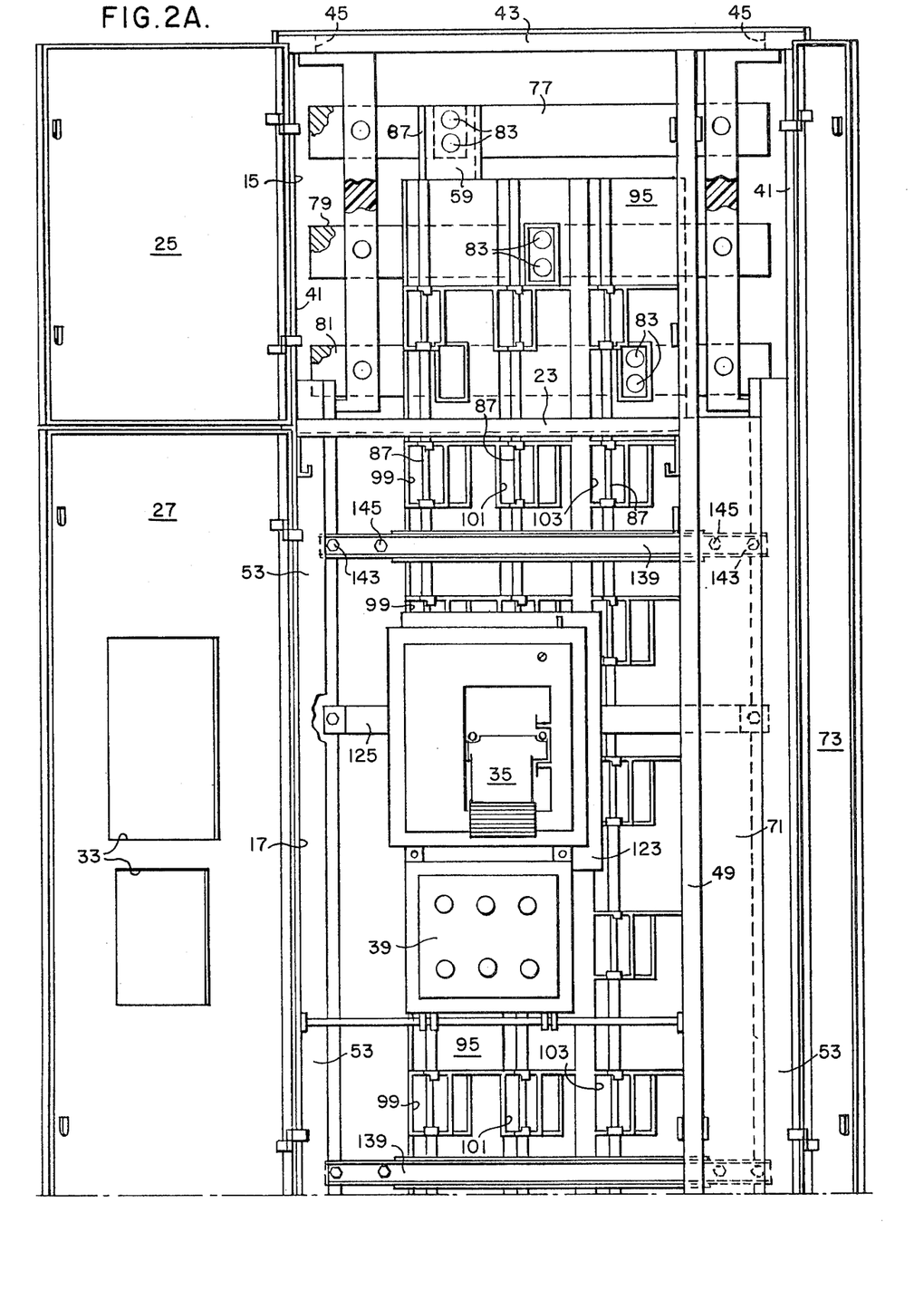
FIG. 2A is a front elevational view of the upper half of the control center with the front doors open.
Figure 3A:
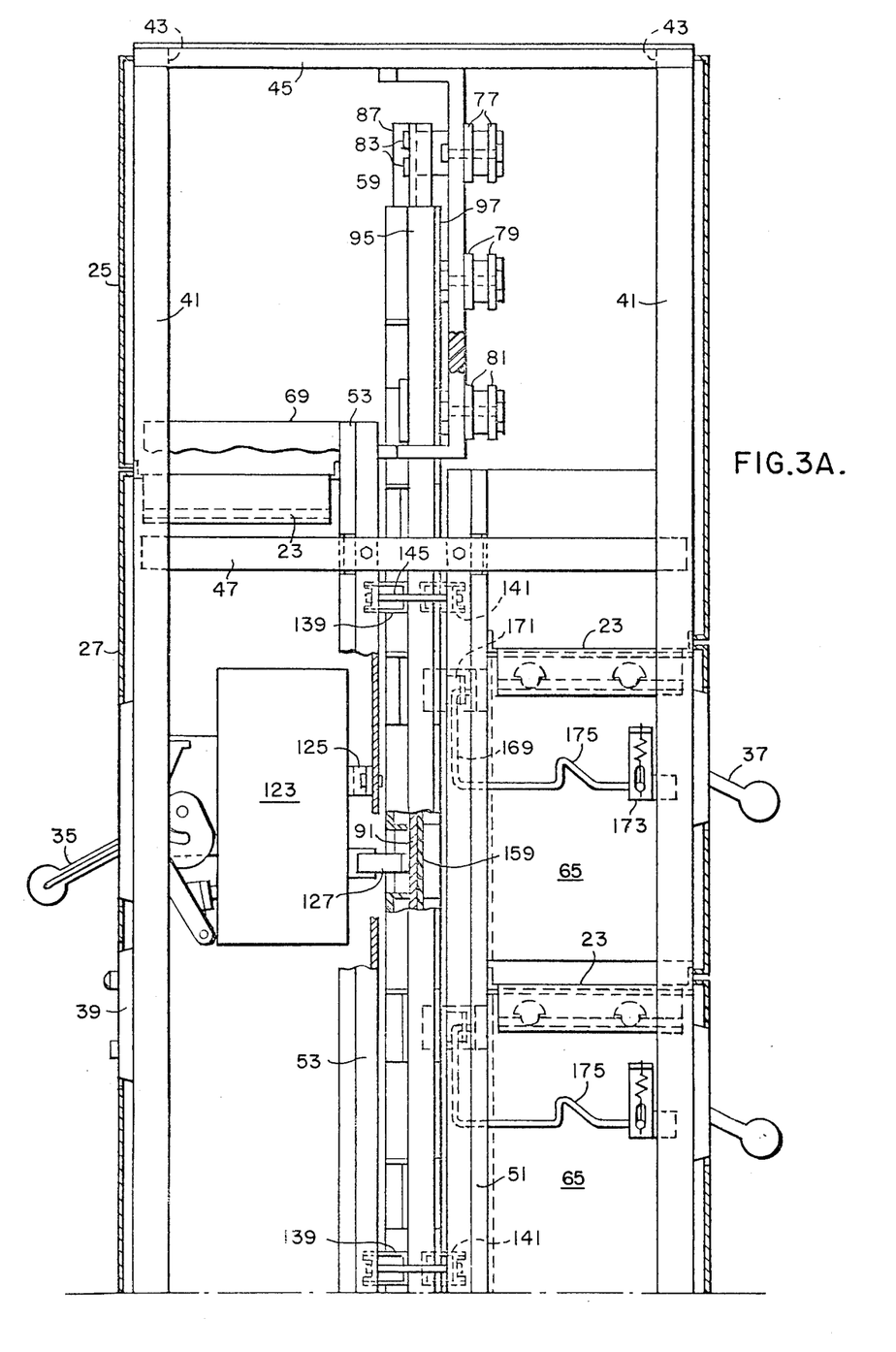
FIG. 3A is a side elevational view of the control center as viewed in FIG. 2A with the doors closed and with the side panel removed.
Figure 3B:
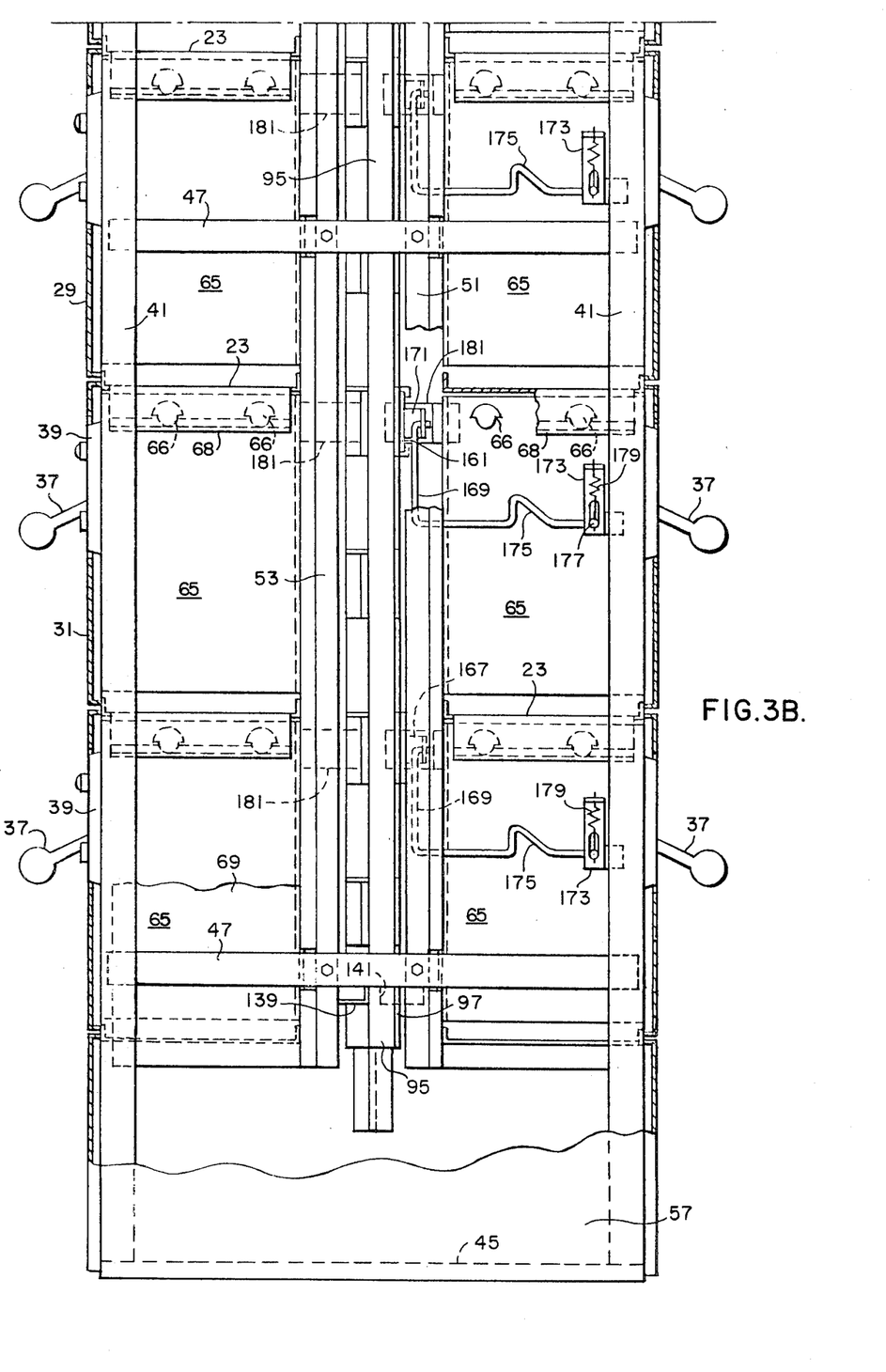
FIG. 3B is a side elevational view of the portion of the control panel shown in FIG. 2B with the doors closed and with the side panel removed.
Figure 6:
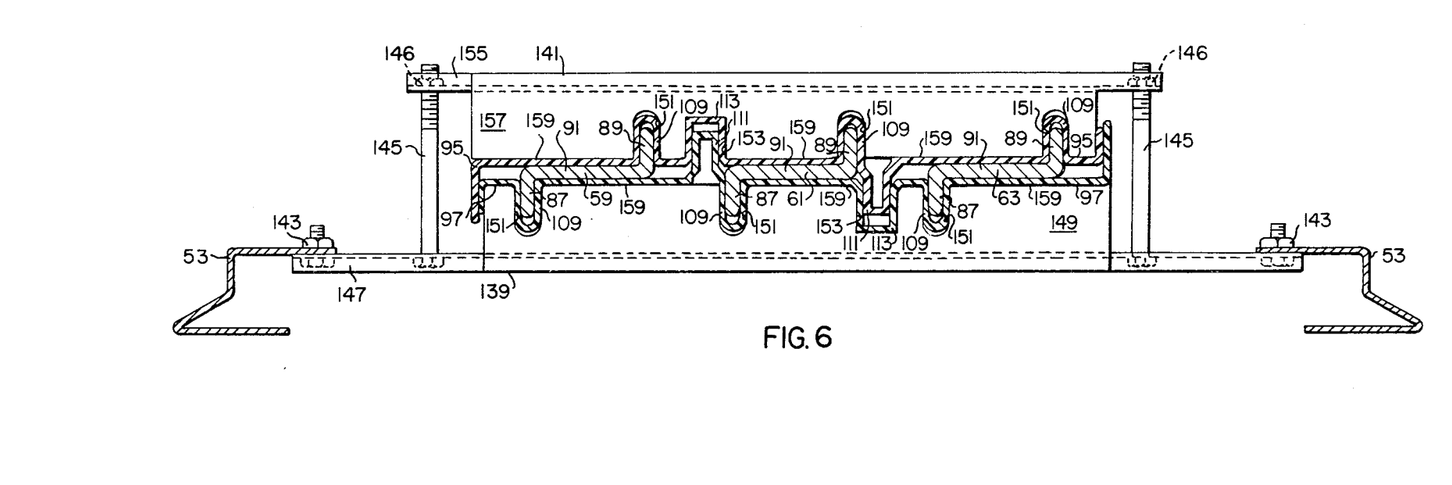
FIG. 6 is a fragmentary horizontal sectional view showing the assembly of the bus bars, insulative barriers and support brackets in place.
Figure 7:
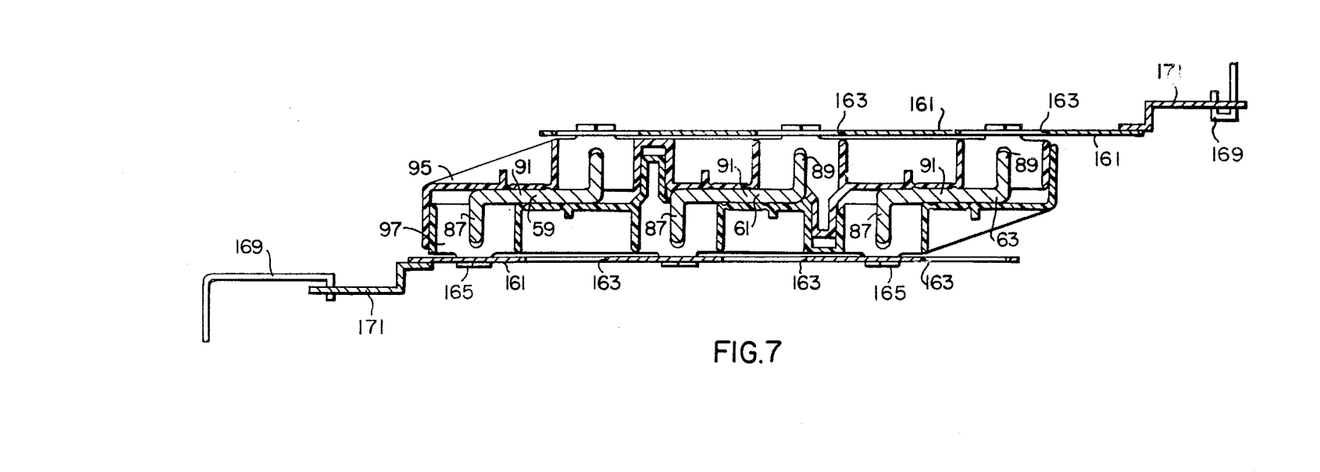
FIG. 7 is a horizontal sectional view showing an assembly of the bus bars, insulative barriers and shutters therefore.

As shown more particularly in FIGS. 2A and 3A, the upper ends of the bus bars 59, 61, 63 are attached to separate horizontal buses 77, 79, 81 respectively by suitable fastening means such as similar pairs of bolts 83. The bus bars 59, 61, 63 extend vertically and substantially throughout the length of the vertical cabinet 13, whereby access to one or both sides thereof may be had by insertion of the several circuit interrupters 65 into appropriate compartments. As shown in FIGS. 4, 6 and 7, the bus bars 59, 61, 63 are preferably Z-shaped and consist of oppositely disposed stabs or legs 87, 89 at intermediate portions 91. The electrical capacity of the bus bars 59, 61, 63 may be increased by attaching metal bar members to the bus bars such as in surface-to-surface contact with the intermediate portions of each bus bar. The legs 87 extend toward the front side and the stabs 89 extend toward the rear side of the cabinet 13, while the intermediate portions 91 are preferably aligned and in a zone parallel to the front and rear sides of the cabinet. Accordingly, each circuit interrupter 65 is provided with similar terminal contact connectors or clips generally indicated at 93 which move into contact with corresponding stabs 87. Although the Z-shaped bus bars 59, 61, 63 are preferably extruded units comprised of an integral member such as an aluminum conductor, the bus bars may also be composed of separate L-shaped members which are secured together such as by bolting along the intermediate portions thereof. As shown in FIGS. 2A and 3B, each circuit interrupter 65 comprises a pair of mounting members 66 which extend from each opposite side wall and engage similar mounting tracks 68, which tracks may depend from the adjacent horizontal shelf 23, or may be separate from the shelves 23 and be mounted on adjacent frame members such as upright posts 41 and 49.

Figures 5, 5A:
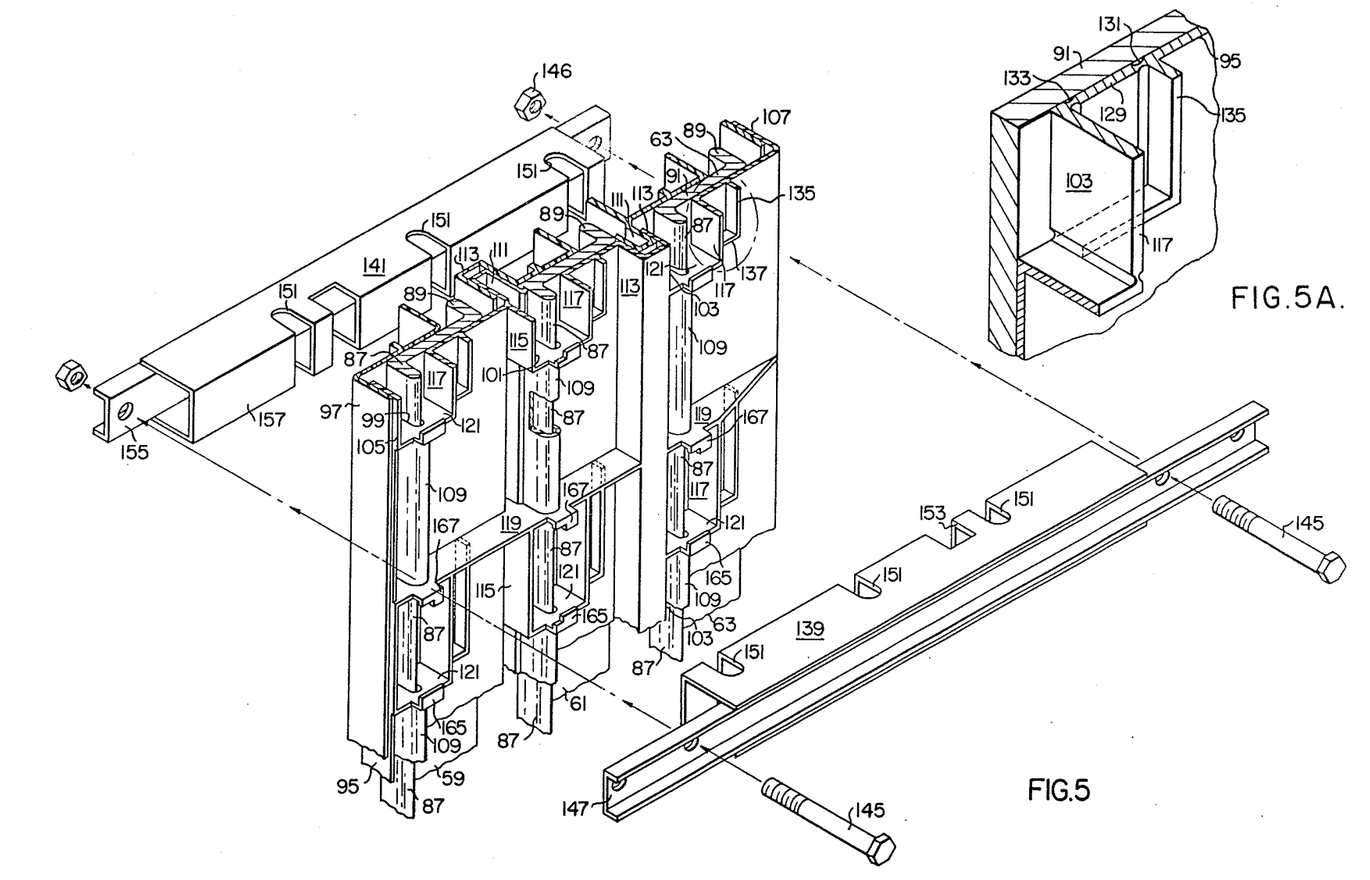
FIG. 5 is a perspective view of an assembly of bus bars and insulative barriers and showing support bars for the barriers in exploded positions.
FIG. 5A is an enlarged fragmentary view of the area encircled in FIG. 5.

The bus bars 59, 61, 63 are enclosed within barrier means, such as a pair of barriers 95, 97, which completely enclose the bus bars. The barriers 95, 97 are substantially coextensive with the bus bars (FIGS. 2 and 3) and enclose the bus bars substantially from the upper to the lower ends thereof. One purpose of the barriers 95, 97 is to electrically insulate the bus bars and increase the safety factor of the control center. Inasmuch as plug-in type interrupters 65 are connected to the bus bars from the front and rear sides of the cabinet 13, the barriers 95 and 97 are preferably of identical construction. At vertically spaced intervals, each barrier includes three horizontally spaced openings 99, 101, 103 through which terminal connectors 93 are inserted. As shown more particularly in FIGS. 4, the barrier 95 is a substantially planar member extending between a flange 105 on the left and a flange 107 on the right. The several openings 99, 101, 103 are provided in the planar surfaces and are in surface-to-surface contact with the intermediate portion 91 of the bus bars 59, 61, 63. In addition, the barriers include vertically extending ribs 109 of U-shaped cross section and into which the stabs 87 project. Thus, the stabs 87 are enclosed by the barriers between each pair of vertically spaced openings 99 as shown in FIGS. 5. To prevent sparkover or arcing from bridging between adjacent pairs of bus bars 59, 61, 63, the barriers include interfitting or interlocking means between each pair of bus bars, which means comprise a vertically extending member 111 that projects transversely from the planar surface of one barrier 95 or 97 into a U-shaped member 113 extending from the planar surface of the other of the barriers 95 and 97. The surfaces between the members 111, 113 are preferably tight-fitting to eliminate any air movement between the adjacent bus bars. The barriers 95, 97 are identical in construction so that the interfitting means, including members 111, 113, as well as the U-shaped ribs enclosing the legs 87, 89, provide a labyrinth passage between one side or flange 105 and the other side or flange 107 of the assembly. In that manner, the possibility of sparking or arcing due to any cause such as the presence of ionized gas is avoided. It is noted that the labyrinth assembly of the barriers and bus bars is maintained notwithstanding the thickness of the bus bars. For example, where higher ratings are necessary, bus bars of greater thickness or gauge may be used in conjunction with the same barriers without eliminating the safety conditions created by the interfitting members 111, 113. In other word, each bus bar is isolated from the others by the assembly of the barriers 95, 97.

Associated with the foregoing is an additional safety aspect of the barriers 95, 97, which comprises laterally extending members surrounding each opening 99, 101, 103 to provide a hood around each exposed leg 87 in the openings. For that purpose, a pair of vertical flanges 115, 117 and a pair of horizontal flanges 119, 121 combine to form a protecting hood around each exposed stab or leg 87 in each opening 101. In a similar manner, the opening 99 is enclosed within upper and lower horizontal flanges 119, 121, as well as vertical flanges 99, 117, and the openings 103 are surrounded by upper and lower horizontal flanges 119, 121 and the members 103, 117. Accordingly, the stabs or legs 87, 89 are protected from accidental contact by the members 115, 117, 119, 121 around each of the spaced openings. Moreover, the provision of a hood or "boxed-in" construction around the exposed stabs minimizes any accidental contact with two or more of the stabs by operating personnel or misplaced conductors such as wires.

As was set forth above, the stabs and legs 87, 89 are exposed within openings of limited size to facilitate connection and disconnection of circuit breakers having terminal connectors 93 as shown in FIG. 4. The cabinet 13, however, is so constructed that circuit interrupters of other types may likewise be connected to the bus bars even though the circuit interrupter is not provided with contact members such as the terminal connectors 93. As shown in FIGS. 2A and 3A, a circuit interrupter 123 is mounted within the cabinet in the compartment 17 on a support bracket 125 extending between the support posts 53. Conductors 127, one of which is shown in FIG. 3A, extend from the circuit interrupter 123 to the intermediate portions 91 of the bus bars where they are secured in a suitable manner such as by fastening bolts, not shown. For that purpose (FIGS. 5A), the barriers 95, 97 are provided with knockout portions 129 of the planar area of the barriers which are easily removed by the provision of reduced sections 131, 133 to expose the intermediate portion 91 of each bus bar to facilitate the attachment of the conductor 127. In addition, the reduced wall section 133 enables the removal of the flange 117 where necessary to provide a larger exposure of the intermediate portion 91. The exposed area, however, is protected by the provision of an additional flange means such as flanges 135, 137 (FIG. 5).

In accordance with this invention, it is noted that (FIGS. 4 and 5) the barriers 95, 97 are in surface-to-surface contact with the bus bars 59, 61, 63, including the intermediate portions 91 and the stabs 87, 89, except for those portions of the bus bar at the openings 99, 101, 103. That is, the barriers 95, 97 are in tight surface-to-surface contact with the bus bars with no air space therebetween. In this manner, the barriers serve as heat sinks for conducting heat away from the bus bars to the surrounding atmosphere. The increased surface area of the bus bars 95, 97, including the several flanges, ribs and the like, cooperate to transfer the generated heat to the surrounding atmosphere with good efficiently. The advantage of the surface-to-surface contact with no air space between the bus bars and the barriers is that the barriers carry the heat away and have good emissivity to dispel the heat better than the prior methods of enclosing bus bars in "dead air." It has been found that where the barriers are composed of a particular electrically insulative material in contact with the bus bars, the bus bars operate 10° C cooler than in open air and 20° C cooler than the bus bars which are in trapped air, that is, air that is contained within housing that is not properly ventilated. Thus, the barriers 95, 97 serve as electrically insulating members between each bus bar 59, 61, 63 and as isolating members to prevent personnel from accidentally touching the bus bars, such as by a screwdriver or a wire. The barriers 95, 97 consist essentially of a thermal setting resinous material selected from the group consisting of polyester, epoxy, phenol and mixtures thereof. A suitable material is isophthalic maleic-glycol, polyester. To strengthen the sheet-like members from which the barriers are molded, the material contains an inorganic reinforcing material such as glass fiber. In addition, the resin includes a filler selected from the group consisting of alumina, aluminum trihydrate, beryllium oxide, calcium carbonate, mica, silica, talc, and mixtures thereof. The sheet-like members from which the barriers are molded have a minimum thickness of about 0.1 inch which provides a light and preferably inexpensive barrier. A satisfactory commercial material is Rosite 3550FM, which is a trademark of the Rostone Company of Lafayette, Ind.

The assembly of the barriers 95, 97 and the bus bars 59, 61, 63 are maintained in tight surface-to-surface contact as well as in position within the cabinet 13 by a pair of horizontal braces 139, 141 (FIGS. 2A, 3A, 4, 5, 6). The end portions of the brace 139 are secured by bolts 143 to the support post 53 and (FIG. 6) the brace 141 is secured to the brace 139 by bolts 145. Several pairs of the braces 139, 141 are disposed at vertically spaced intervals along the length of the assembly of the barriers and bus bars. The brace 139 includes a bar 147 and a channel member 149 secured thereto in a suitable manner, such as welding or riveting. The channel member 149 includes horizontally spaced notches 151 and 153. Likewise, the brace 141 comprises a bar 155 and a channel member 157. The channel member 157 comprises notches 151 and 153 similar to those on the channel member 149. When in place opposite edges of the channel members 149, 157 engage the planar surfaces of the barriers 95, 97 at 159, the notches 151 surround and engage the ribs 109, and the notches 153 surround and engage the U-shaped member 113. The braces 139, 141 are retained in clamping engagement with the insulative barriers by tightening nuts 146 on the bolts 145 to maintain the barriers 95, 97 in tight surface-to-surface contact with the bus bars 59, 61, 63. The advantage of the pair of braces 139, 141 is that the braces on each side of the assembly hold the barriers tightly in place to maintain the intimate contact between the barriers and the buses for satisfactory heat transfer and for maintaining isolation between the spaced bus bars. They also support and brace the bus bars against the effects of electromagnetic forces generated under short circuit conditions.

Figure 2B:
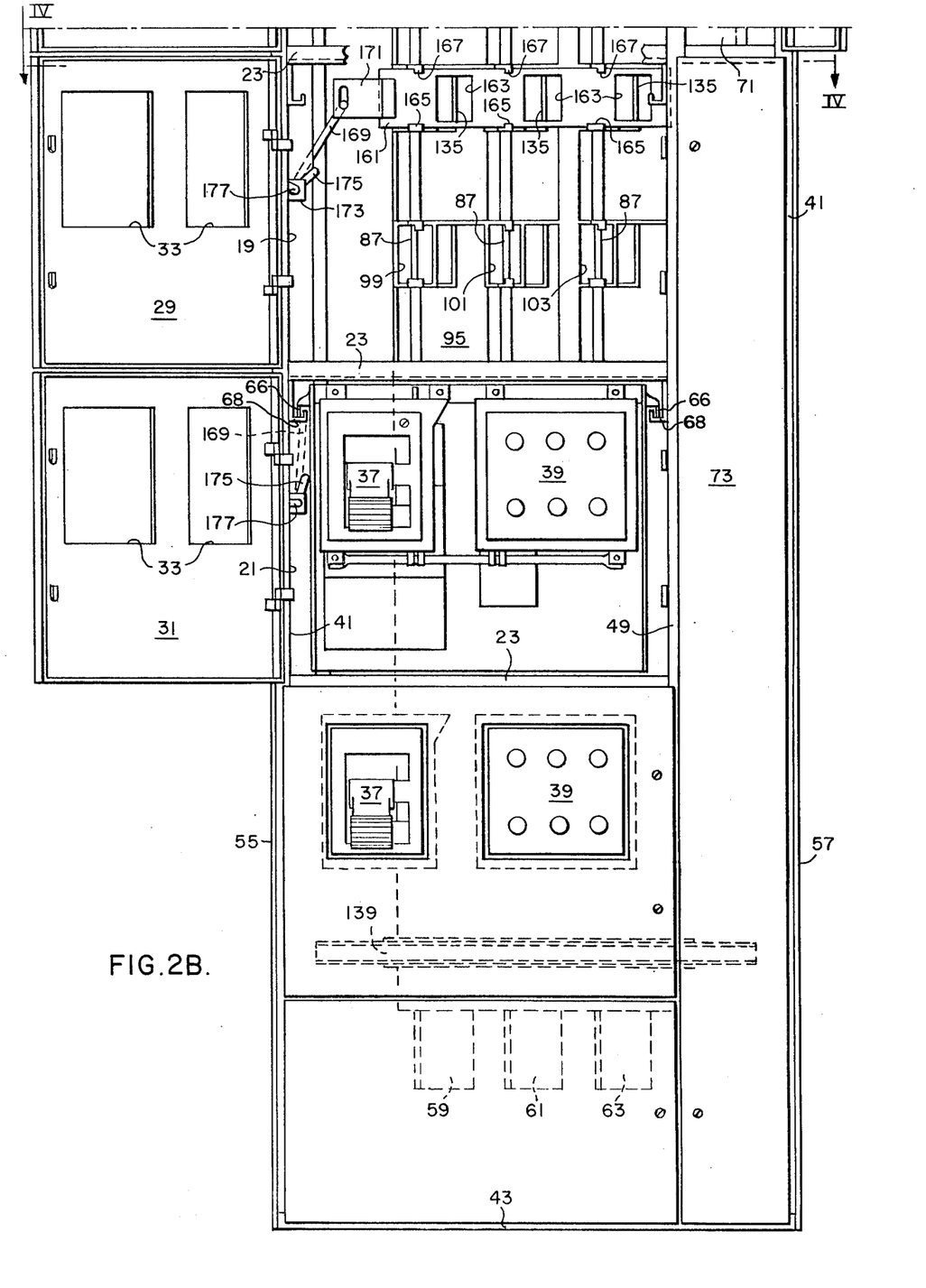
FIG. 2B is a front elevational view of the lower half of the control center with two of the doors open.

When one or more of the circuit interrupters 65 are removed from the cabinet 13, the stabs 87 are exposed through the openings 99, 101, 103 so as to provide an unsafe condition. For that reason, shutter means are provided for closing the several openings when a circuit interrupter 65 is removed from a particular compartment 19. As shown in FIG. 2A, by way of example, a shutter 161 is mounted on each barrier 95, 97 to cover the openings 99, 101, 103 in each horizontal group. The shutter 161 is a sheet-like member consisting of a dielectric material such as the material comprising the barrier 95, 97. The shutter 161 comprises three holes 163 which are horizontally spaced by a distance corresponding to the spacing between the openings 99, 101, 103. As shown more particularly in FIG. 5, up-turned and down-turned tabs 165 and 167 are provided on the flanges 119, 121 at each opening in the barrier for retaining the shutter 161 in place. The shutter is movable horizontally by a cam or lever 169 which is operatively connected to the shutter 161 by a connecting member 171 (FIGS. 2B, 4, 7). The cam or lever 169 is a rod-like member, one end portion of which is turned at substantially a right angle for connection to the shutter and the intermediate or body portion of which extends through an opening (not shown in FIG. 4) and through a mounting bracket 173 which is attached to the corner post 41. The body portion of the lever 65 includes an outwardly inclined cam segment 175 which extends into the path of travel of one side of the circuit interrupter 65A. When the circuit interrupter 65A is moved into the compartment 19 toward the legs 87, it contacts the segment 175 and thereby rotates the lever 169 counterclockwise (FIG. 2B) to move the shutter 161 to the left in order to align the holes 163 with the openings 99, 101, 103. Thus, the terminal connectors 93 are free to move into engagement with the corresponding stabs 87 as shown with the fully inserted circuit interrupter 65 in the rear portion of the cabinet in FIG. 4. An end portion 177 of the lever 169 extends through a slot in the mounting bracket 173 and is biased upwardly by a spring 179 (FIG. 3B) in order to rotate the lever to the shutter-closed position when the circuit interrupter 65A is withdrawn. The position of the lever 169 in the shutter-open position is shown in FIG. 2B. Thus, the combination of the barriers 95, 97 and the shutters 161 combine to provide substantially total enclosure of the bus bars 59, 61, 63 and thereby maximize personnel safety and equipment protection.

Figure 8:
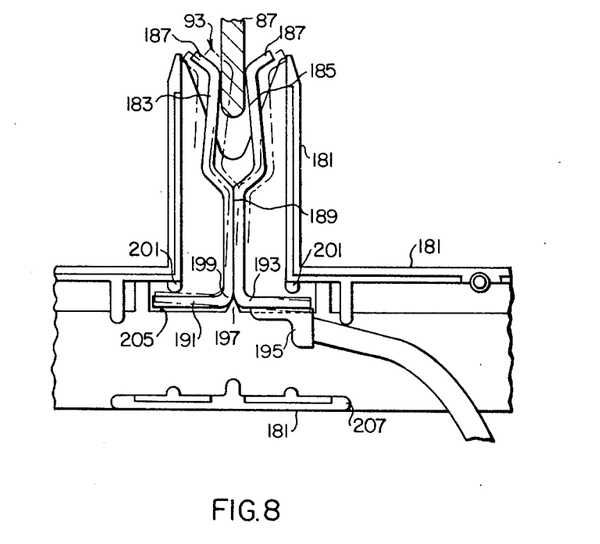
FIG. 8 is a fragmentary horizontal view showing one stab assembly for one circuit breaker and showing the manner in which the stab is movable for alignment with a bus bar.
Figure 9:
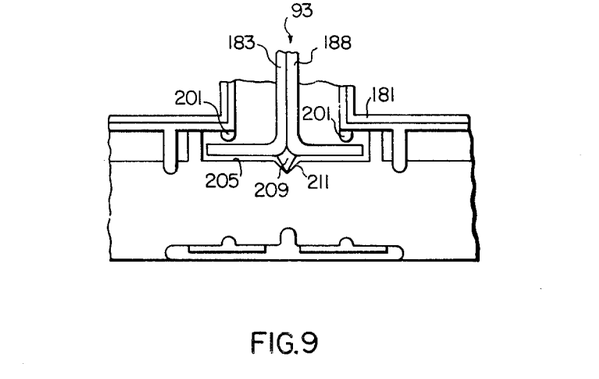
FIG. 9 is a fragmentary horizontal view of another embodiment of the manner of mounting the stab assembly of FIG. 8.

The electrical connection between the individual motor controller unit or circuit interrupter 65 and the vertical bus leg 87 requires a floating type of terminal connector 93 in order to effect positive contact alignment and guiding to the bus bar stab. The terminal connector 93 for each phase (FIG. 4) is contained within a cover or housing 181 which is shown more particularly in FIG. 8. The terminal connector 93 comprises a pair of oppositely disposed flexible contacts 183, 185, the outer ends of which are flared outwardly at 187 for guiding the connector 93 into alignment with the stab 87. The flexible contacts 183, 185 are secured together such as by a weld at 189 and lower end portions 191 and 193 are flared outwardly in opposite directions as shown. A conductor assembly 195 is secured to one of the out-turned portions 93. More particularly, the terminal connector 93 is pivotally mounted on pivot point 197 which extends into a groove 199 formed by the out-turned end portions 191, 193. The connector 93 being contained within the housing 181 is free to rotate right or left about the pivot point 197, which rotation is limited by projections 201 of the housing 181. Thus, the out-turned end portions or flanges 191, 193, being disposed between the projections 201 and a recess wall 205 in the housing, are limited in their degree of rotation about the pivot point 197. The extent of rotation on either side of the pivot, however, is within reasonable limits of misalignment between the axis of the terminal connectors 93 and a particular legs 87 so that when the circuit interrupter 65A is moved into engagement with the legs 87, the contacts 183, 185 rotate into proper alignment. Inasmuch as the housing 181 is a shell-like member surrounding and mounting the terminal connectors 93 in place, it is provided with an opening 207 through which the conductor 195 passes into the main portion of the circuit interrupter 65. Another embodiment of the means for mounting the terminal connector 93 is shown in FIG. 9 in which similar numbers refer to similar parts of FIG. 8. A pivot point 209 may be provided as a part of the contacts 183, 185, which is located within a pivot notch 211 in the housing 181. In a similar manner, the terminal connector 93 is free to rotate to a limited extent in either embodiment of FIGS. 8 and 9 as limited by the projections 201 and the recess wall 205.

Accordingly, the motor control center of this invention provides new concepts in metal enclosed control units to enable the increase range of useful operation. By providing safeguards for both personnel and equipment, the motor control unit of this invention is readily adaptable to a variety of operating conditions including circuit interrupters of various types without sacrificing safety.

What is claimed is:

1. A circuit interrupter for use in drawout switchgear and comprising a stationary housing having stationary bus bars, a circuit breaker in the housing and comprising spaced terminals, the terminals being movable into and out of contact with the bus bars when the circuit breaker is moved into and out of the housing, each terminal comprising a base and a pair of outturned flexible contacts disposed on opposite sides of an axis and engageable with opposite sides of a bus bar, the base comprising oppositely outturned portions extending from the sides of the axis, a dielectric housing for at least the outturned portions, the base being pivotally mounted within the housing to effect rotation laterally of said axis, pivot means between the base and the housing comprising a pivot point in one of the base and housing and a pivot notch in the other thereof, and the housing having spaced surface means between which the outturned portions are located for limiting rotation of the terminal and for retaining the pivot point in the pivot notch, whereby the terminal is free to move limitedly to align with a bus bar.

2. The circuit interrupter of claim 1 in which said pivot point is on the housing and said notch is in the base.

3. The circuit interrupter of claim 1 in which said spaced surfaces comprise projections in the housing.

4. The circuit interrupter of claim 3 in which the housing comprises laterally extending walls, the projections being located on the wall on one side of the housing, and the pivot point is located on the wall on the other side of the housing.

5. The circuit interrupter of claim 4 in which the housing comprises wall portions extending around the pair of flexible contacts, and said wall portions having an access opening for the bus bar.

* * * * *